United States Patent
Vähäsöyrinki

(10) Patent No.: US 9,662,783 B2
(45) Date of Patent: May 30, 2017

(54) MICROMANIPULATOR ARRANGEMENT

(71) Applicant: SensApex Oy, Oulu (FI)

(72) Inventor: Mikko Vähäsöyrinki, Oulu (FI)

(73) Assignee: SensApex Oy, Oulu (FI)

( * ) Notice: Subject to any disclaimer, the term of this patent is extended or adjusted under 35 U.S.C. 154(b) by 90 days.

(21) Appl. No.: 14/356,908

(22) PCT Filed: Nov. 6, 2012

(86) PCT No.: PCT/FI2012/051081
§ 371 (c)(1),
(2) Date: May 8, 2014

(87) PCT Pub. No.: WO2013/068642
PCT Pub. Date: May 16, 2013

(65) Prior Publication Data
US 2014/0277712 A1    Sep. 18, 2014

(30) Foreign Application Priority Data

Nov. 10, 2011 (FI) ....................... 20116111

(51) Int. Cl.
*G06F 19/00* (2011.01)
*B25J 7/00* (2006.01)
(Continued)

(52) U.S. Cl.
CPC ............. *B25J 7/00* (2013.01); *G02B 21/32* (2013.01); *H02N 2/02* (2013.01); *H02N 2/025* (2013.01)

(58) Field of Classification Search
CPC .... B25J 7/00; H02N 2/00; H02N 2/02; G02B 21/32
(Continued)

(56) References Cited

U.S. PATENT DOCUMENTS

| 5,325,010 A | 6/1994 | Besocke et al. |
| 5,332,275 A * | 7/1994 | Conway .................. B25J 7/00 294/100 |

(Continued)

FOREIGN PATENT DOCUMENTS

| JP | 7314358 A | 12/1995 |
| JP | 2001260095 A | 9/2001 |

(Continued)

OTHER PUBLICATIONS

International Search Report; PCT/FI2012/051081; mailed Mar. 11, 2013.

(Continued)

*Primary Examiner* — Jerrah Edwards
*Assistant Examiner* — Rachid Bendidi
(74) *Attorney, Agent, or Firm* — Zielger IP Law Group, LLC

(57) ABSTRACT

The aspects of the disclosed embodiments relate to a micromanipulator arrangement that includes at least one drive stem, at least one movable element arranged on the drive stem to move along the drive stem wherein the drive stem being arranged to cause a change in a position of the movable element with respect to the drive stem; wherein an additional factor exists having an effect in the change of the position of the movable element and the micromanipulator arrangement further comprises means for compensating said additional factor such that said effect is diminished.

19 Claims, 14 Drawing Sheets

(51) Int. Cl.
*G02B 21/32* (2006.01)
*H02N 2/02* (2006.01)

(58) Field of Classification Search
USPC ....... 700/245; 310/328, 323.17, 323.18, 330, 310/317; 355/53, 72, 75
See application file for complete search history.

(56) References Cited

U.S. PATENT DOCUMENTS

| | | | |
|---|---|---|---|
| 5,397,323 A * | 3/1995 | Taylor | A61B 19/2203 606/130 |
| 5,402,801 A | 4/1995 | Taylor | |
| 5,943,914 A | 8/1999 | Morimoto et al. | |
| 6,459,473 B1 | 10/2002 | Chang et al. | |
| 2005/0006986 A1 | 1/2005 | Kallio et al. | |
| 2005/0023930 A1 | 2/2005 | Petrenko | |
| 2006/0074406 A1 | 4/2006 | Cooper et al. | |
| 2006/0164619 A1 | 7/2006 | Back et al. | |
| 2008/0174757 A1 * | 7/2008 | Hummel | G03F 7/70825 355/67 |
| 2009/0225297 A1 * | 9/2009 | Bleidistel | G02B 7/023 355/67 |
| 2010/0115671 A1 | 5/2010 | Pryadkin et al. | |
| 2010/0234857 A1 * | 9/2010 | Itkowitz | A61B 19/2203 606/130 |
| 2011/0199597 A1 * | 8/2011 | Hummel | G03F 7/70825 355/55 |
| 2013/0296886 A1 * | 11/2013 | Green | A61B 19/22 606/130 |
| 2013/0320353 A1 * | 12/2013 | Kryiouk | H01L 21/0237 257/76 |

FOREIGN PATENT DOCUMENTS

| | | |
|---|---|---|
| JP | 2003052716 A | 2/2003 |
| JP | 2007290096 A1 | 12/2007 |
| WO | 2011055000 A1 | 5/2011 |

OTHER PUBLICATIONS

Finnish Office Action; National Board of Patents and Registration of Finland; Application No. 20116111; mailed Oct. 9, 2012.
"Stick-Slip Based Micropositioning Stage for Transmission Electron Microscope"; Holub, O. et al; Proceedings of the 9th IEEE international workshop on advanced motion control (AMC'06), Istanbul, Turkey, Mar. 23006, Piscataway: IEEE2006, ISBN 0-7803-9511-1, DOI: 10.1109/AMC.2006.1631707, p. 484-487, XP 010918224.
"Quantifying Growth Mechanics of Living, Growing Plant Cells In Situ Using Microbotics"; Felekis, D et al.; The Institution of Engineering and Technology Journal; 6(5): 311-316, May 30, 2011, <DO1:10, 1049/MNL:20110024> <URL: http://ieeexplore.ieee.org/xpls/abs_all.jsp?arnumber=5775900>. ISSN 1750-0443.
"Nanomanipulation in a Scanning Electron Microscope"; St. Fahlbusch et al.; Journal of Materials Processing Technology 167 (2005) 371-382 www.elsevier.com/locate/jmatprotec.
"Design for Precision: Current Status and Trends"; Schellekens, P et al.; Annals of the CIRP, vol. 47, No. 2, 1998, p. 557-586, ISSN 0007-8506, DOI: 10.1016/S0007-8506(07)63243-0, XP 022146134.
"Design of a Large Measurement-Volume Metrological Atomic Force Microscope (AFM)"; Eves, Brian J. ; Measurement Science and Technology; vol. No. 8, Jun. 30, 2009 (Jun. 30, 2009), ISSN 0957-0233, DOI:10.1088/0957-0233/20/8/084003, XP 020160495.
Extended European Search Report, Application No./Patent No. 12848073.8—1712/2776215 PCT/F12012/051081, mailed Oct. 26, 2016, 12 pages.

* cited by examiner

MICROMANIPULATOR ARRANGEMENT

FIELD

The aspects of the present disclosure related to controlling a tool in a micromechanical fashion, especially to a micromanipulator system, a micromanipulator element and a micromanipulator element stack for the same.

BACKGROUND

In vitro fertilization (IVF) and electrophysiology are examples of biomedical areas with increasing interest, where objects are very small and visible only under a compound microscope with objective lenses and special equipment is needed for conducting experiments.

Actuators utilizing micromechanical principles such as piezoelectric drive provide for advantages in biosciences, where precise manipulation of microscopic tools is needed. The piezoelectric principle allows to control the position of a tool attached to a movable element on a piezoelectric drive with small increments, and combining multiple piezoelectric drives makes it possible to manipulate the tool in multiple directions.

Precision in biomedical studies is advantageous as in many experiments it is useful to design experiments with defined locations representing the sample and which thus are of interest to the research. Equally important is the accuracy of the information gathered, as only biologically relevant information is valuable. If the positioning of the instruments is not sufficiently accurate for the experimental setup, the reliability of the experiment suffers.

Furthermore, this should be achieved in a limited space under a microscope stage; the magnifications used to study cells limit the working distance under a microscope and biomedical research may require multiple instruments to create proper environmental control for the experiments, especially if live cells may be used.

The current solutions for manipulating a tool in a microscopic manner do not fulfil these needs completely. Many devices are clumsy to operate and large, and yet they may display significant drift of the tool position over time, or lack desired accuracy. In addition, special objectives may be required to increase the working distance or to provide sufficient angles for the tools to fit under the field of view of the objective.

There is, therefore, a need for a solution that may require less space and can provide for better control in the change of the position of the movable element along the drive stem.

SUMMARY

Now there has been invented an improved method and technical equipment implementing the method, by which the above problems are alleviated. Various aspects of the present disclosure include a system, an apparatus, a method, a computer, a control module and a computer readable medium comprising a computer program stored therein, which are characterized by what is stated in the independent claims. Various embodiments of the present disclosure are disclosed in the dependent claims.

The aspects of the present disclosure relate to a micromanipulator arrangement comprising at least one drive stem, for example two, three, four or more drive stems arranged in a parallel manner (with respect to each other), at least one movable element arranged on the drive stem to move along the drive stem(s) wherein the drive stem(s) being arranged to cause a change in a position of the movable element with respect to the drive stem; wherein an additional factor exists having an effect in the change of the position of the movable element and the micromanipulator arrangement further comprises a force-generating unit for compensating said additional factor such that said effect is diminished. For example, using two drive stems to move a movable element allows to have a small-sized micromanipulator element and arrangement as a whole. Drive stems require less power to move the movable element, and to hold the element in place, very little or no power may be needed. Two or more parallel drive stems allow to omit a separate linear guide because the parallel drive stems operate as linear guides preventing rotation and misplacement. The use of drive stems thus allows to make the element and arrangement smaller and reduce the power consumption, and consequently, the micromanipulator arrangement can be made to operate wirelessly.

According to a first aspect, there is provided a micromanipulator arrangement comprising at least two drive stems arranged in a parallel manner, a movable element arranged on the drive stems to move along the drive stems wherein the drive stems being arranged to cause a change in a position of the movable element with respect to the drive stem; wherein an additional factor exists having an effect in the change of the position of the movable element and the micromanipulator arrangement further comprises means for compensating said additional factor such that said effect is diminished.

According to an embodiment, the micromanipulator arrangement comprises an element stack with a first micromanipulator element, a second micromanipulator element, the first micromanipulator element being mounted on a moving part of the second micromanipulator element, wherein said at least one micromanipulator element is a piezoelectric element or a magnetostrictive element. According to an embodiment, the micro-manipulator arrangement comprises at least one force-generating part arranged to interact with at least one micromanipulator element such that the force-generating part can provide essentially constant compensation by mechanical means for the effect in the change of position of at least one movable element, element stack or micromanipulator arrangement caused by an additional factor. According to an embodiment the force-generating part is a spring that produces essentially constant force in its normal operating area regardless of the extension of the spring. According to an embodiment the micromanipulator arrangement comprises a controller unit arranged to communicate with other devices connected to the arrangement in such a way that the controller unit can gather information and based on the gathered information provide compensation by electronic means for the effect in the change of position of at least one movable element, element stack or micromanipulator arrangement caused by an additional factor. According to an embodiment, the controller unit comprises at least one electronic device for measuring, storing or processing information, and producing, sending or receiving a pulse-width modulated signal based on the received information. According to an embodiment, the micromanipulator arrangement further comprises a position sensor for detecting position of a micromanipulator element. According to an embodiment the micromanipulator arrangement comprises a sensor arranged to provide a feed-back signal based on detected position of the movable element. According to an embodiment the micromanipulator arrangement comprises means for receiving a feed-back signal from a position sensor. According to an embodiment, the micromanipulator arrangement comprises an adjustment unit, said adjustment unit arranged to send, receive and handle information in digital form to provide compensation for the effect in the change of position of at least one movable element, element stack or micromanipulator arrangement caused by an additional factor, such that an essentially homogenous movement of said movable element is achieved. According to an embodiment, the micromanipulator arrangement comprises means for a wireless control arrangement of at least one movable element, element stack, circuit card, control unit or micromanipulator arrangement.

According to a second aspect, there is provided a method for controlling a micromanipulator arrangement comprising at least two drive stems arranged in a parallel manner, and a movable element arranged on the drive stems to move along the drive stems, the drive stems being arranged to cause a change in a position of the movable element with respect to the drive stem, said method comprising setting a reference position for a movable element of the micromanipulator arrangement, detecting actual position of said movable element, determining an effect of an additional factor having an effect in the change of the position of the movable element based on a difference between said reference position and said actual position, and compensating at least partly said effect of said additional factor in the micromanipulator arrangement using a compensation controller unit.

According to an embodiment, the method comprises, based on said detecting of said actual position, determining a compensation for compensating at least partly said effect of said additional factor, wherein said compensation comprises adjusting a drive voltage of a driving unit for driving said movable element. According to an embodiment, the method comprises, based on said detecting of said actual position, determining a compensation for compensating at least partly said effect of said additional factor, wherein said compensation comprises adjusting a number of drive pulses of a driving unit for driving said movable element. According to an embodiment, the determining an effect of an additional factor comprises forming a function by a calibration procedure, said function being indicative of compensation needed at different instances to reach a target position in order to compensate for non-homogeneity of movement of said movable element. According to an embodiment, the function comprises a mapping table between a position and at least one from the group of drive voltage, drive frequency and a pulse ratio.

According to third aspect, there is provided a control unit for micromanipulator arrangement, said control unit comprising means for carrying out the method for controlling a micromanipulation arrangement according to previously described aspects.

According to a fourth aspect, there is provided a computer program product for a micromanipulator system, said computer program product comprising computer program code arranged to, when said computer program code is executed on at least one processor of the system, to cause the system to carry out the method for controlling a micromanipulation arrangement according to previously described aspects.

According to a fifth aspect, there is provided using constantforce-generating part such as a constant-force spring to compensate for an effect caused by gravity in a micromanipulator arrangement, where said micromanipulator arrangement comprises at least two drive stems arranged in a parallel manner, and a movable element arranged on the drive stems to move along the drive stems, the drive stems being arranged to cause a change in a position of the movable element with respect to the drive stem.

According to a sixth aspect, there is provided a wireless micromanipulator, said micromanipulator comprising at least two drive stems arranged in a parallel manner, and a movable element arranged on the drive stems to move along the drive stems, the drive stems being arranged to cause a change in a position of the movable element with respect to the drive stem, wherein an additional factor exists having an effect in the change of the position of the movable element and the micromanipulator further comprises a force-generating unit for compensating said additional factor such that said effect is diminished. According to an embodiment, the additional factor is a load caused by gravity and the force-generating unit is a constant-force spring.

DESCRIPTION OF THE DRAWINGS

In the following, various embodiments of the present disclosure will be described in more detail with reference to the appended drawings, in which.

DETAILED DESCRIPTION OF EXAMPLE EMBODIMENTS

Figure 1:
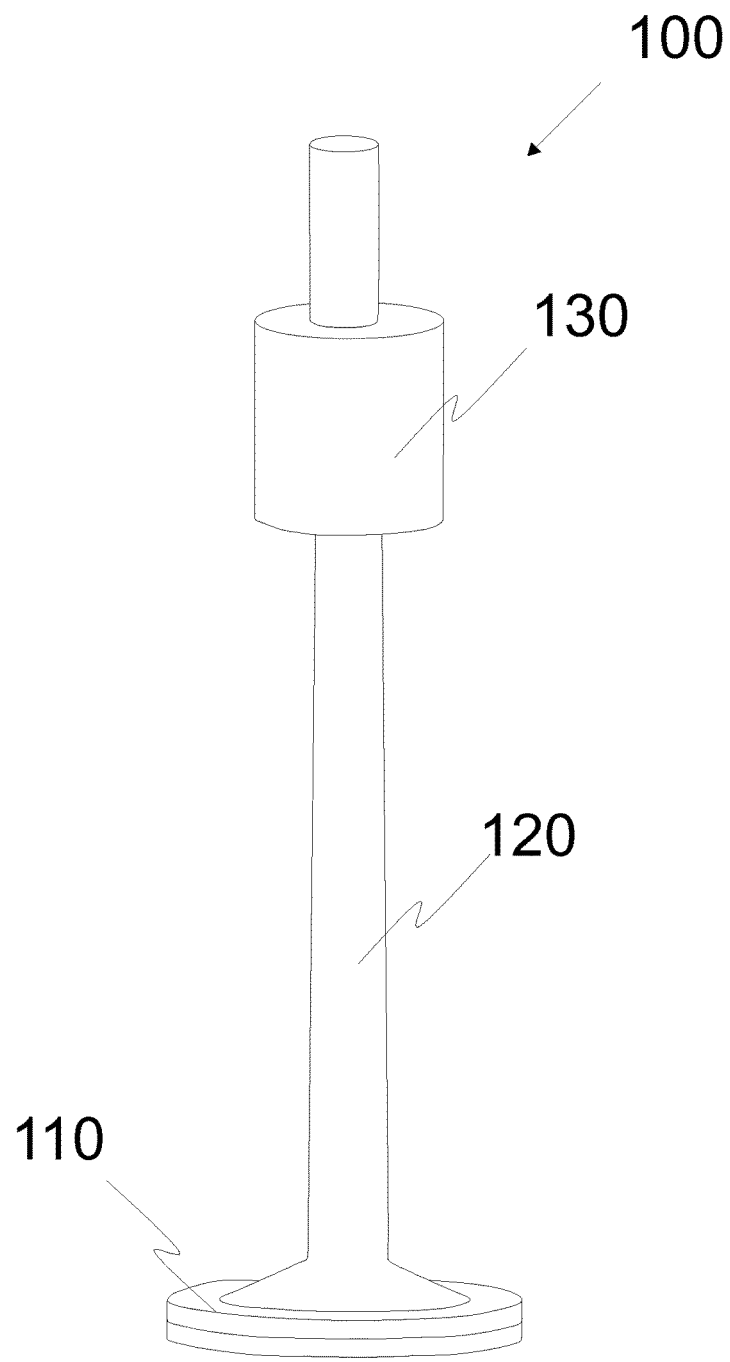
FIG. 1 shows a piezoelectric element for manipulating a position of a tool attached to the moving part of the piezoelectric element according to an example embodiment.

In the following, several embodiments of the present disclosure will be described in the context of micromanipulator arrangement that comprises at least one drive stem and at least one movable element arranged on the drive stem that may move along the drive stem, wherein the drive stem may be arranged to cause a change in a position of the movable element with respect to the drive stem and additional factors may exist having an effect in the change of the position of the movable element. The term micromanipulator arrangement or micropositioner or micromanipulator or micromanipulator system may refer to, but is not limited to, controlling a tool in a micromechanical fashion, wherein a micromanipulator element or element stack may refer to, but is not limited to, an actuator or linear stage or the like.

Using a drive stem based design, for example one where the drive stem is used as a linear guide, allows to diminish the inaccuracy present in many other types of micromanipulators. In the present disclosure it was anyway surprisingly noticed that additional factors exist which have an effect in the micromanipulator arrangement and change of the position of the movable element even though the drive stem arrangement is of accurate nature e.g. such that it may require no external force to keep the moving element in the same position while at rest. These factors may comprise mechanical factors such as forces, like gravitational force or friction caused by a load and the like or electrical factors such as changes in current, voltage or amplitude affecting the drive stem elements or the like or changes in the driving impulses along the drive stem. These factors may cause various sources of inaccuracy into the positioning and/or disrupt the homogeneity of the positioning in the system. It has also been noticed that there may occur drifting, where the parts gradually shift away from their original position as a function of time. Drifting can be caused by mechanical factors or changes in the temperature of the system, which may cause heat expansion. Further, materials may behave differently depending of their heat expansion coefficients, which are specific to each material. In addition the step size of the movable element may vary in respect to the angle which the movable element may have in comparison to the coordinate plane where it may be attached to (such as the microscope stage, for example). The step size may in addition be different in upward and downward directed movement, and may depend on the gravitational load which is affected by the angle of the vertical component of the movement. The higher the angle is, the bigger is the effect of the gravitational load. Further, the amplitude or wavelength or phase of the vibration wave in the drive stem, such as a piezoelectric drive stem, may alter or change as a function of distance or time. This may cause a different step size to occur depending on the position of the moving element. Furthermore, the load of the tool or other equipment that may be attached to the micromanipulator may cause increased forces such as friction, pressure, torsional stress or tensile stress to the movable element and may also vary as a function of distance, angle or time. The effect of the various additional factors may be due from one additional factor or it may be a combination of several additional factors.

Therefore, means for compensating said additional factors such that said effect may be diminished may be provided. It is to be noted, however, that the aspects of the present disclosure are not limited to micromanipulator arrangements as described above. In fact, the different embodiments have applications widely in any environment where precise movement or accurate positioning is required.

Compensation as stated in this present disclosure may comprise measures to diminish the deviation in distance between a reference position, such as target or earlier or original position and an actual position, or it may comprise features or parts or elements which may diminish the effect of an additional factor, such as a gravitational force due to the mass of an object or load, e.g. by producing a counter-force that may act against such a factor.

FIG. 1 shows an example embodiment of piezoelectric element for manipulating a position of a tool attached to the moving part of the piezoelectric element. The piezoelectric element 100 may comprise a piezoelectric component 110 connected to a stem or rod 120 which may also be called a drive stem. The piezoelectric component 110 may change shape when an electric voltage is applied across the component. Since the component 110 is attached to components that do not change shape, an alternating electric voltage causes a vibration that may be passed to the stem 120. The vibration may cause a travelling wave in the rod 120, and/or it may cause a standing wave to the extent it is reflected from the end of the rod. There may be a moving component movably attached to the rod. The attachment of the movable component may be such that there may be considerable friction between the movable element 130 and the rod 120.

When the rod moves fast due to the vibration and/or wave in the rod, the inertia of the movable element may keep it essentially in place, and when the rod moves slowly, the movable element may move essentially with the movement of the underlying rod. In addition, since the friction between the movable element and the rod may be larger when the rod is at rest in relation to the movable element, the first movement of the rod after a resting period may cause a larger movement in the movable element that a subsequent movement of the rod when the rod is already in motion relative to the movable element. These effects may cause the movable element to move a short distance along the rod during every cycle of the vibration. It may therefore become possible to cause a movement of the movable element 130 by applying an alternating voltage across the piezoelectric component 110. Such alternating voltage may have the shape of a triangular sawtooth, or it may have the shape of a pulse train, or it may have some other shape. The leading edges of the waveform may have a slower rate of change than the trailing edges so that the rising edge of each wave takes more time to reach the target voltage than it takes for the falling edge to come down. These relations may be reversed, or the leading and trailing edges may have the same rate of change. The pulse ratio or the waveform may be adapted to change the speed of the movement.

Figure 2A:
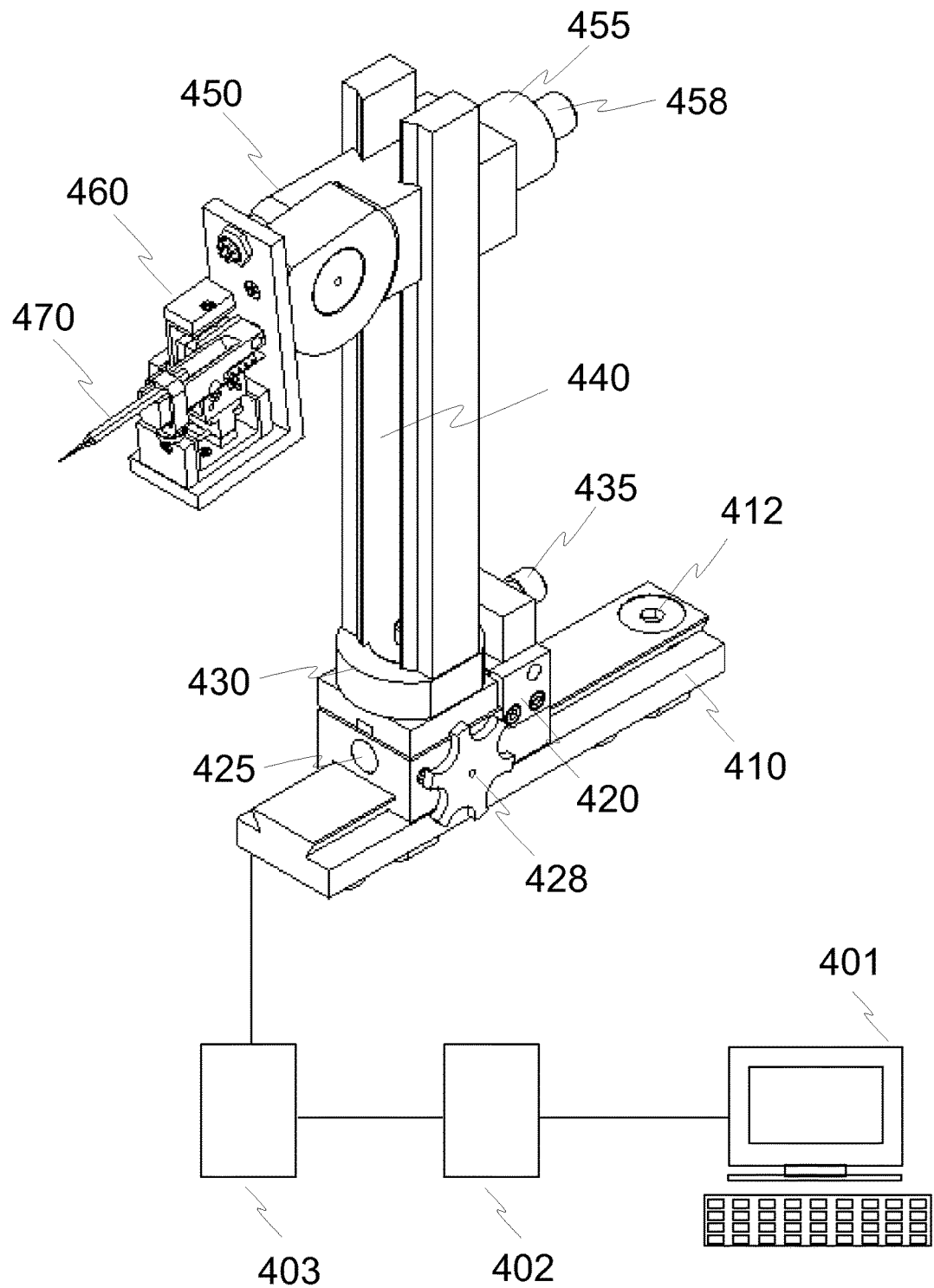
FIGS. 2a, 2b, 2c and 2d show a micromanipulator system according to an example embodiment.

FIG. 2a shows a micromanipulator system for manipulating a tool according to an example embodiment. The micromanipulator system may comprise a computer 401, a controller 402, and an interface 403 and may be attached to a rail 410 for moving the tool 470 towards and away from the target. The rail 410 may be attached to the table with the help of magnets that may be releasable from a screw 412 or other releasing means. It may also be attached to the table with bolts if the table is non-magnetic. The sliding base 420 of the system may be also attached to the rail 410 with the help of magnets, or with the help of a locking screw operated by a turn wheel 428. The base 420 may comprise a hinged structure allowing the tipping of the upper part of the system away from the target. The hinged structure may be held in place with the help of magnets that are releasable from a knob 425. Tipping the upper part away from the target may allow for easy access to the part holding the tool 470 e.g. for changing or adjusting the tool. Accessing the tool may also be facilitated by sliding the base from front to the back position on the rail, and these two positions can be set for example by limiting stops placed on the rail.

Figure 2B:
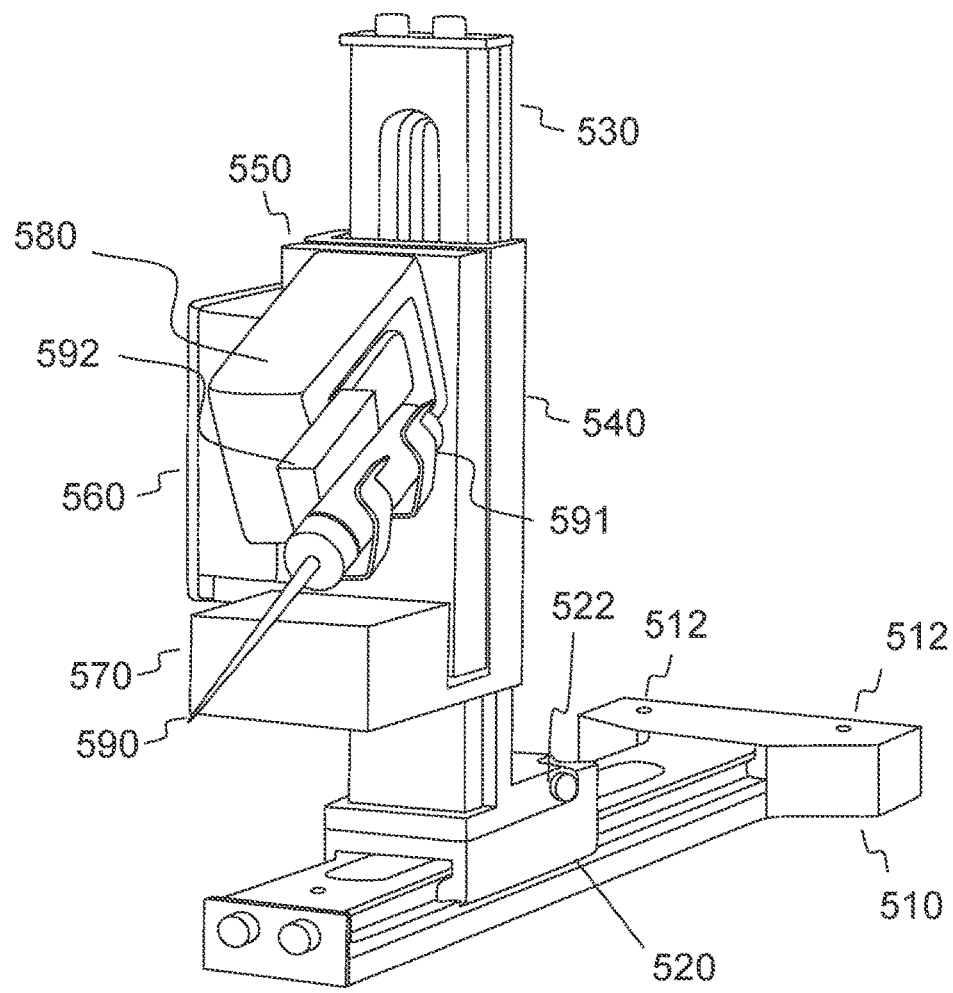

FIG. 2b shows a micromanipulator system for manipulating a tool according to an example embodiment. The micromanipulator system may comprise or be attached to a rail 510 for moving the tool 590 towards and away from the target. The rail 510 may be attached to the table with the help of magnets or bolts 512 if the table is non-magnetic. The rail 510 may further be bolted to the table through a groove located in the middle of the rail 510. The sliding base 520 of the system may be also attached to the rail 510 with the help of magnets, or with the help of a locking screw (not shown) located on the back of the vertical support arm 530. The base 520 may comprise a hinged structure with a locking screw 522 allowing the tipping of the upper part of the system away from the target. The hinged structure may be held in place with the help of magnets that are releasable by twisting the vertical support arm 530 of the sliding base backwards. The support arm is attached to a L-shaped frame 540, on which is a micromanipulator stack comprising micromanipulator elements 560, 570 and 580 are mounted. The frame may have additional space between the micromanipulator stacks and the vertical part of the frame to attach a box 550 that may contain a battery and/or electronic circuit, such as a control unit for controlling the micromanipulator elements. The electronic circuit may comprise control arrangement of at least one movable element, element stack, circuit card, control unit or micromanipulator arrangement via cables or wires or it may comprise means for a wireless control arrangement of at least one movable element, element stack, circuit card, control unit or micromanipulator arrangement. This may be advantageous if the micromanipulator arrangement is operated through a wireless controller in situations where space is limited, the experiments may need isolation of the surroundings or extra wiring may be otherwise problematic.

The bottom-most first micromanipulator element 560 on the stack may be fixed to the support structure with the help of e.g. screws, glue, magnets or other means of attachment through the bottom and provides for movement along a first axis, say the x-direction, by moving the movable element along the rods or stems of the piezoelectric components. The second micromanipulator element 570 may be attached to the movable element of the first micromanipulator element 560 directly e.g. with an adapter, a linear guide or with help of screws or other means of attachment. The second micromanipulator element 570 provides for movement along a second axis, say the y-axis. The third micromanipulator element 580 may be attached from the bottom of the chassis to the second micromanipulator element 570 by fixing it sideways with screws or bolts to the top of movable element of the second micromanipulator element 570.

The third micromanipulator element 580 may be attached to a holder 592 with two or more clamps 591 to secure an electrode 590. The holder may be retracted along the axis of the third micromanipulator element 580 for convenient replacement of the electrode. The electrode can further be adjusted to different angles by tightening screws which attach the holder to the third micromanipulator element 580. A center screw is bolted to the micromanipulator element 580 through a circular hole and keeps the holder in place while two other screws are fitted to the micromanipulator element 580 through arching slits which allow the angle of the holder to be adjusted.

Figure 2C:
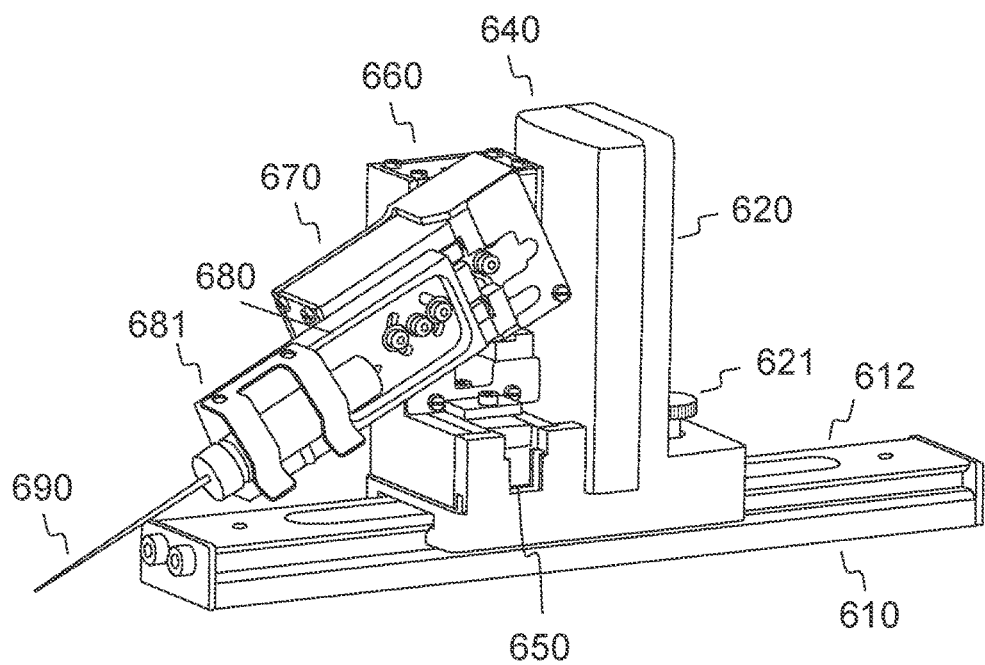

FIG. 2c shows a micromanipulator system for manipulating a tool according to an example embodiment. The micromanipulator system may comprise or be attached to a rail 610 for moving the tool 690 towards and away from the target when replacing it. In normal use it may be in the front position to better position the tool 690 to the target. The rail 610 may be attached to the table with the help of magnets or bolts 612 if the table is non-magnetic. The rail 610 may further be bolted to the table through a groove located in the middle of the rail 610. The sliding base 620 of the system may be also attached to the rail 610 with the help of magnets, or with the help of a locking screw 621. The sliding base may have a vertical support plate, which may have additional space between the stack comprising the micromanipulator elements 650, 660, 670 and the vertical part of the frame to attach a box 640 that may contain a battery and/or electronic circuit, such as a control unit for controlling the micromanipulator elements. The electronic circuit may comprise control arrangement of at least one movable element, element stack, circuit card, control unit or micromanipulator arrangement via cables or wires or it may comprise means for a wireless control arrangement of at least one movable element, element stack, circuit card, control unit or micromanipulator arrangement.

Figure 2D:
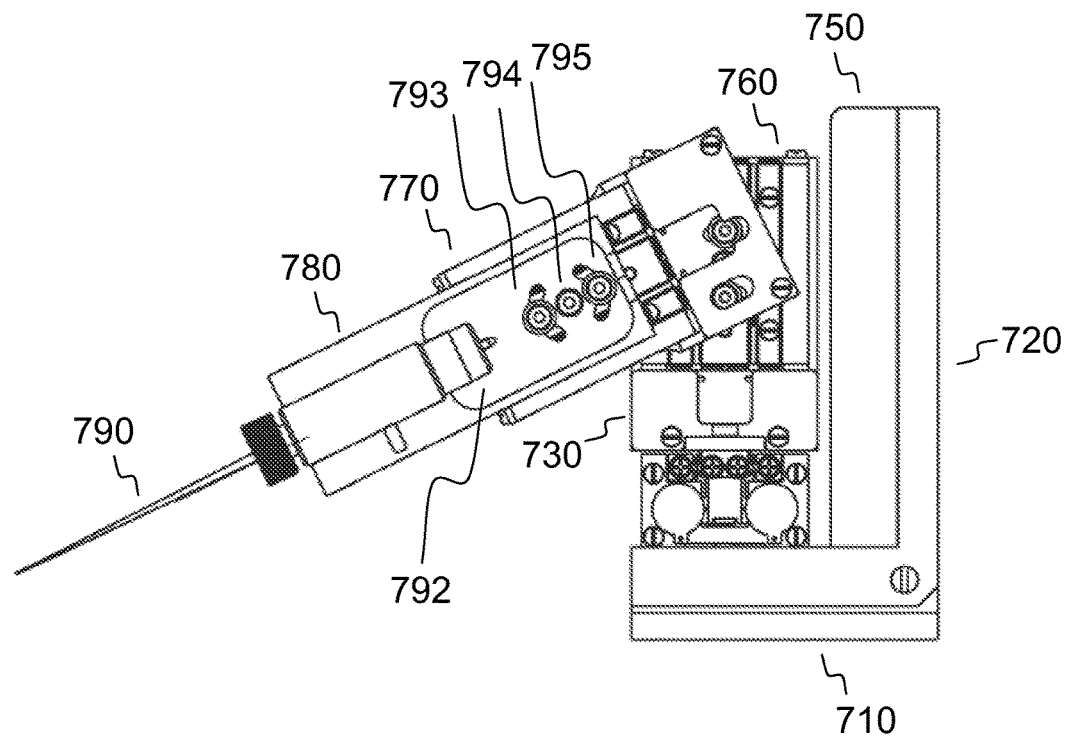

The third micromanipulator element 670 may be attached to a holder 680 with two or more clamps 681 to secure an electrode 690. The holder may be retracted along the axis of the third micromanipulator element 580 for convenient replacement of the electrode. The electrode can further be adjusted to different angles by tightening screws which attach the holder to the third micromanipulator element 670. A center screw is bolted to the micromanipulator element through a circular hole and keeps the holder in place while the two other screws are fitted to the micromanipulator element through arching slits which allow the angle of the holder to be adjusted, as is also shown in FIG. 2d. In this example embodiment the adjustment of the electrode angle is advantageous, as the low stand profile, sliding base and multi directional movement together with the tool angle adjustment feature allow the tool to be positioned near the sample in a low angle. As the working distance under a microscope is typically only a few millimeters and can on higher magnifications such as 20×, 40× or 60× be even less, the low angle enables the tools to be inserted to targets that on a higher angles could be very hard. Furthermore, the approach angle of conventional microscope objectives, i.e. the angle formed by the objective barrel, which may be quite bulky in diameter, and the front lens assembly housing, is low and prevents tools to be inserted to the field of view from high angles. For micromanipulator purposes, such as patch-clamping experiments, special objectives have been developed but these may be expensive and limited in desired properties for the experiments. This example embodiment allows more suitable or even better objectives to be used for such purposes.

In FIG. 2d a micromanipulator system for manipulating a tool according to an example embodiment is shown. Three micromanipulator elements 730, 760 and 770 are stacked together. The micromanipulator stack is connected to the base part of an L-shaped stand 720 by bolts through the chassis of the first micromanipulator element 730. The base may be attached to a table with the help of a magnet or with bolts (not shown) and may comprise a hinged structure 710 allowing the tipping of the upper part of the system away from the target. The hinged structure may be held in place with the help of magnets that are releasable by twisting the stand backwards. Tipping the upper part away from the target may allow for easy access to the part holding the tool 790 e.g. for changing or adjusting the tool. Accessing the tool may also be facilitated by sliding the holder 780 front to the back position on the rail. The stand 720 may have a space for a box 750 that may contain a battery and/or electronic circuit, such as a control unit for controlling the micromanipulator elements. The electronic circuit may comprise control arrangement of at least one movable element, element stack, circuit card, control unit or micromanipulator arrangement via cables or wires or it may comprise means for a wireless control arrangement of at least one movable element, element stack, circuit card, control unit or micromanipulator arrangement.

Figure 3A:
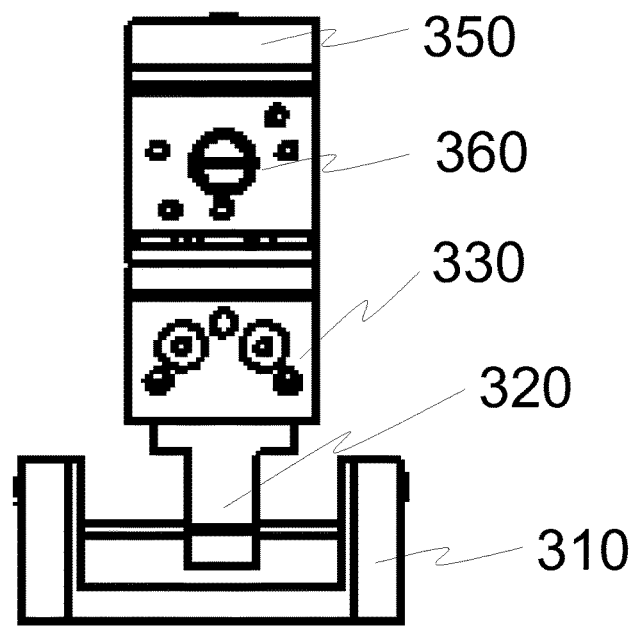
FIGS. 3a and 3b show a micromanipulator element stack for manipulating a tool in multiple directions according to an example embodiment.
Figure 3B:
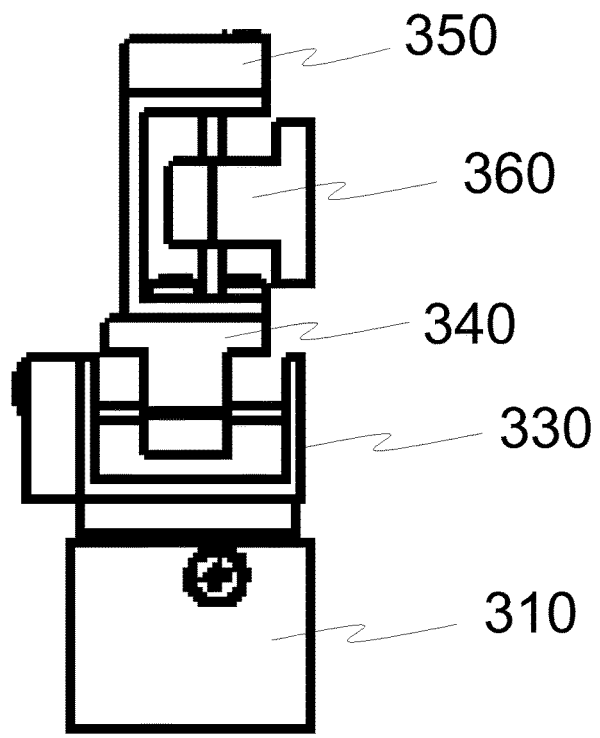

FIGS. 3a and 3b show a micromanipulator element stack from two different directions for manipulating a tool in multiple directions according to an example embodiment. The last (third) micromanipulator element 310 on the stack provides for movement along a first axis, say the x-direction, by moving the movable element 320 along the rods or stems of the piezoelectric components. The last element 310 may have a relatively large movement of the movable element 320 in relation to the other micromanipulator elements 330 and 350. The last micromanipulator element 310 may be fixed to the support structure with the help of e.g. screws, glue, magnets or other means of attachment. The second micromanipulator element 330 may be attached to the movable element 320 of the first micromanipulator element 310 directly e.g. with the help of screws or other means of attachment. The second micromanipulator element 330 provides for movement along a second axis, say the y-axis.

The first micromanipulator element 350 may be attached to the movable part 340 of the second micromanipulator element 330. The first micromanipulator element 350 may be attached sideways from the side of the chassis to the movable part 340. Such an arrangement may make it possible to omit an adjustment piece (L-piece) between the first and the second micromanipulator element, which would be needed if the first micromanipulator element 350 were only attachable from the bottom of the chassis. The movable element 360 of the first micromanipulator element 350 may move along a third axis, say the z-axis, an essentially vertical axis in this figure. The axes of movement of the different micromanipulator elements in the stack may be essentially orthogonal to each other, or they may create non-orthogonal angles with each other. The stack may comprise one, two, three or more micromanipulator elements. A tool may be attached to the first micromanipulator element.

Figure 4A:
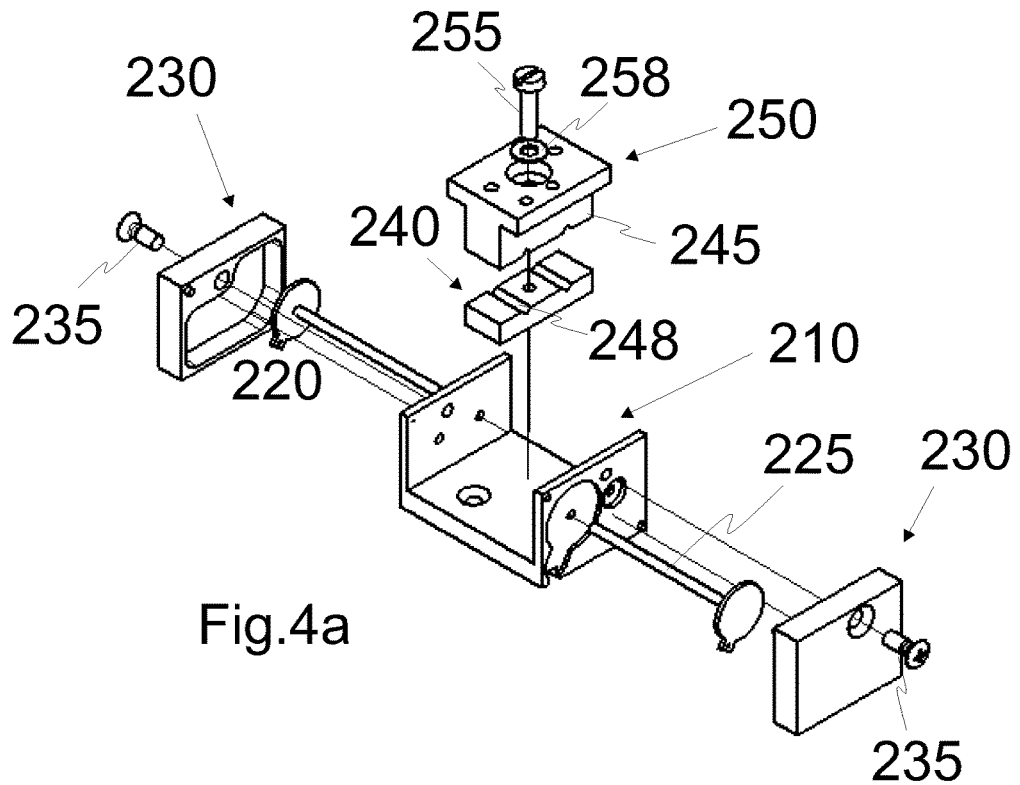
FIGS. 4a and 4b show a micromanipulator element for manipulating a tool in one direction according to an example embodiment.
Figure 4B:
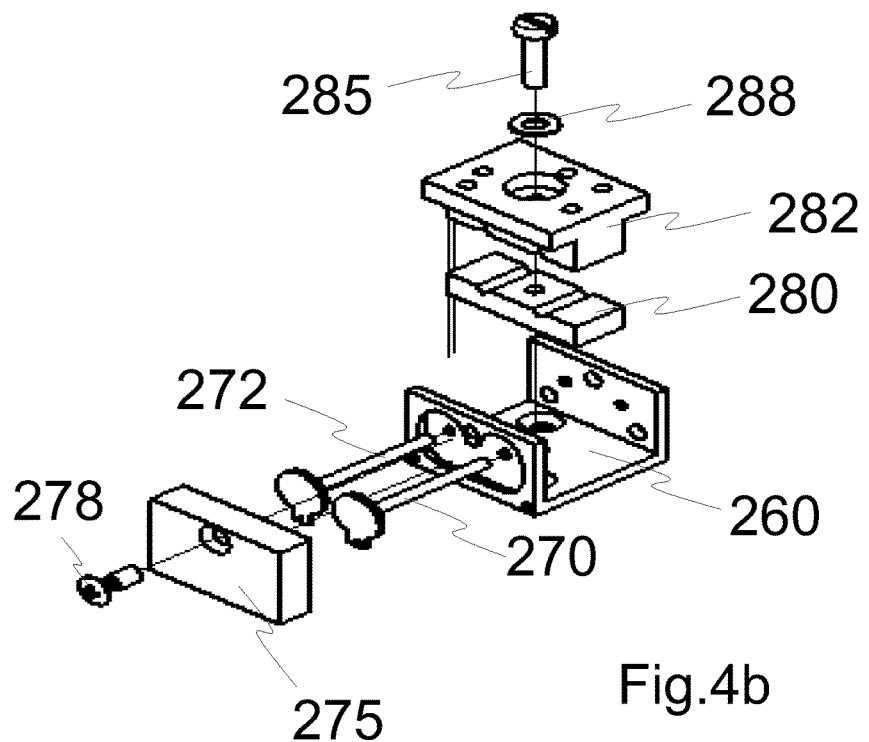

FIGS. 4a and 4b show a micromanipulator element for manipulating a tool in one direction according to an example embodiment. In FIG. 4a, the chassis 210 of the micromanipulator element is a U-shaped part that may have fittings and holes for holding the piezoelectric elements 220 and 225. The piezoelectric elements 220 and 225 may be placed in the chassis so that their rods are essentially parallel, and that the piezoelectric components of the elements 220 and 225 are on different sides of the chassis. The piezoelectric elements 220 and 225 may be held in place with elastic glue and casings 230 may be attached to the chassis with screws 235 to protect the elements and their electrical connections. In an example embodiment there may be one, two, three or more piezoelectric or magnetostrictive elements with rods or drive stems or shafts in a micromanipulator element. Example embodiments with more than one rod placed on a chassis may be advantageous as these may stabilize the structure and provide enhanced support for linear movement, i.e. the may prevent possible twisting (rotation) of the moving element. Furthermore, by adding more than one piezoelectric element the power produced to move a movable element may be increased, which may allow larger loads to be used on the micromanipulator arrangement.

The movable element may comprise two or more parts 240 and 250. The parts of the movable element may have grooves 245 and 248 for fitting around the piezoelectric elements 220 and 225, respectively. The parts 240 and 250 may be pressed together with the help of a screw 255 that is loaded to a certain pressing force with the help of a spring 258. The force generated by such a spring may be of the order of a few Newtons, for example 3 Newtons, 6 Newtons or 10 Newtons, or it may be considerably higher, e.g. of the order of 100-1000 Newtons or lower, e.g. 0.1-1.5 Newtons, depending on application. The force generated by the spring creates a friction between the movable element and the rods of the piezoelectric elements, thereby allowing operation of the linear piezoelectric drive as described in reference to FIG. 1. It may be noted that the movable element may be attached to the rods of the piezoelectric elements essentially without separate ball bearing guides, which may allow simplicity in structure and smaller size. However, additional ball bearing guides parallel to the piezoelectric elements may be introduced to increase weight bearing capacity of the micromanipulator element. Other types of linear guides and bearing types may be used, as well, to provide precise linear movement and stabilize the structure.

A micromanipulator element may thereby for example be constructed using aluminium frame, aluminium sled, two piezoelectric elements fixed to graphite rods, which may be glued with elastic glue to the frame and disc spring of elastic material. Graphite rods may be fixed to the frame with glue, and the two halves of the sled may be fixed together with a disc spring and screws. The micromanipulator element may utilize a piezoelectric component, or a magnetostrictive component, or another component allowing precise microscopic movement of the movable element. The micromanipulator element may be compact in size, and may not require bearings.

In FIG. 4b an embodiment for the micromanipulator element is shown. The element may have a chassis 260, piezoelectric elements 270 and 272, a casing 275 for holding the piezoelectric elements in place with the help of a screw 278. The movable element may comprise two or more parts 280 and 282 that may be held in place with the help of a screw 285 and a spring 288, as in FIG. 4a. The micromanipulator element of FIG. 4b has the piezoelectric elements placed parallel to each other so that their piezoelectric components are on the same side of the chassis. This allows the attachment of the chassis 260 from the other side more easily, for example to construct a micromanipulator element stack so that one of the elements is attached sideways in relation to the other elements.

Figure 5:
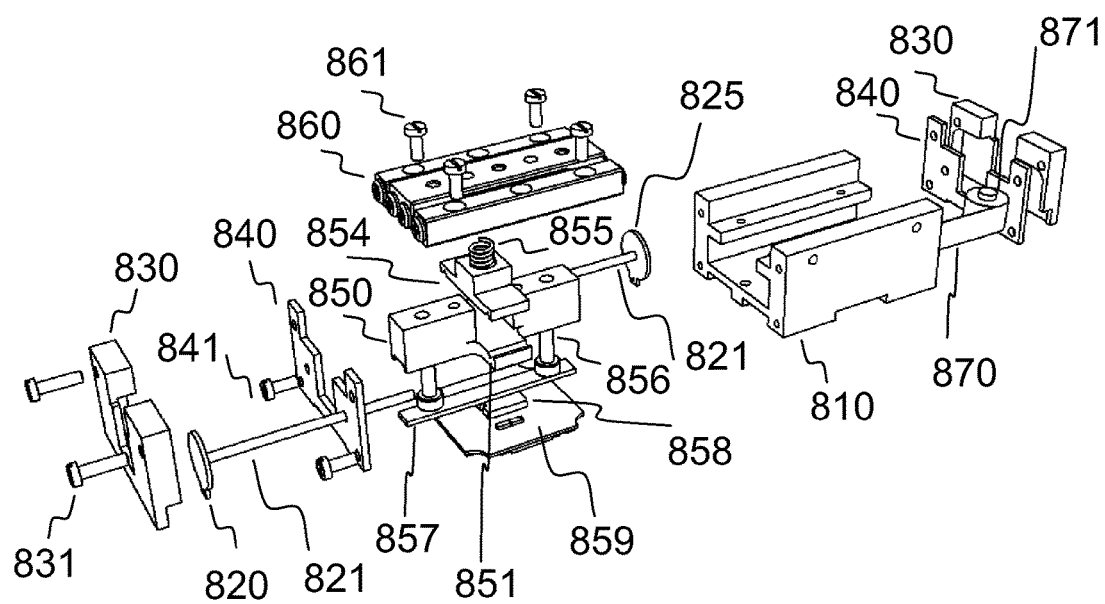
FIG. 5 shows a micromanipulator element for manipulating a tool in one direction according to an example embodiment.

FIG. 5 shows a micromanipulator element for manipulating a tool in one direction according to an example embodiment. The movable element may comprise parts 850, 854, 855, 856, 857, 860, 861 or more. The parts of the movable element may have grooves 851 for fitting around the piezoelectric elements 820 and 825. The parts 850, 854 and 860 may be pressed together with the help of screws 856 that is loaded to a certain pressing force with the help of a spring 855. The spring may be pressed form above through the linear guide 860 with an adjustable screw (not shown) through the centremost hole in the linear guide 860. The adjustable screw may be locked with an axis used to adjust the angle of the actuators or the electrode holders that servers also as a screw sleeve. As described previously in FIGS. 4a and 4b, in an example embodiment there may be one, two, three or more piezoelectric or magnetostrictive elements with rods or drive stems or shafts in a micromanipulator element. Example embodiments with more than one rod placed on a chassis may be advantageous as these may stabilize the structure and provide enhanced support for linear movement.

The chassis 810 of the micromanipulator element is a U-shaped part shielding the micromanipulator element. The piezoelectric elements 820 and 825 may be placed in the chassis so that their rods are essentially parallel, and that the piezoelectric components of the elements 820 and 825 are on different sides of the chassis. The piezoelectric elements 820 and 825 may be glued from their ends to the side frames 840 and the stems 821 held in place by grooves 851 in a sledge block 850 and a lid 854 facing the sledge block 850. The stems 821 may not extend to the other end of the structure, as this advantageously increases the movement range of the element, while the linear guides may maintain the linearity of the movements. The lid 854 may be pressed against the block 850 by a spring 855, which may be held in place by a linear guide 860 with crossed roller bearings held in place by one or more screws, e.g. four screws 861. The force generated to the spring may be adjusted with an adjustment screw and may be of the same class as described above for FIGS. 4a and 4b.

The guide block 860 and the chassis 810 may be attached together directly with one or more screws, e.g. four screws 861. The lid 854 may be attached to the sledge block 850 with screws (not shown) and may comprise the movable element inside the hull structure. The sledge block 850 may be attached to the linear guide 860 with one or more screws, e.g. two screws 856, below which is attached a scale such as a magnetic stripe or a scale with optical units 857 used for position detection. Below the scale 857 is a component or sensor 858, for example a magnetic sensor such as a Hall-sensor or an optical component, which is located on an electronic circuit 859, for example an H-bridge driver circuit. The circuit 859 may be connected to the piezoelectric elements 820 and 825 by wires. In an example embodiment where a magnetic stripe is used for the scale 857, the polarity of the magnetic stripe may switch on a distance between 1-10 mm, for example every 1 mm, 2 mm, 3 mm, 5 mm, 8 mm or 10 mm, or it may be switch more frequently, for example between 100-1000 µm. In an example embodiment where the sensor 858 is a position sensor, the resolution of the position sensor 858 may be in the order of 100-1000 nanometers, for example 100 nm, 250 nm, 500 nm or 750 nm. The repeatability of the component 858 may be in the order of 1 to 10 µm, for example 1 µm, 2 µm, 4 µm, 6 µm or 9 µm or it may be considerably lower, e.g. of the order of 100-1000 nm. In an example embodiment the position sensor 858 may detect the pole switches if the magnetic stripe 857 passes over it, and thus may send a signal to a processor or a control unit. Advantageously the sensor 858 and the scale 857 may be used for detecting positions, which allow for feed-back looping, i.e. detecting and sending a location signal between different positions such as steps and enable compensation that may be based on an actual or current position and reference position such as a target, original or earlier position to diminish the effect of any additional factors that may induce inaccuracy to the travel distance. By providing this information during a drive to a process where distance to travel is set, it can be used to achieve the aimed distance more accurately. The compensation may be for example in the form of adjusting the number of drive pulses or the drive voltage. The position detection for compensation may thus be based on magnetic sensors or optical sensors or by other means of position detecting that may provide feed-back signal of the current position to a control unit.

The movable element, or a part it comprises, such as the sledge 850, may comprise a constant force spring 870 attached to the side frame 840 or chassis 810 or other part of the micromanipulator element. Advantageously it may be attached to the chassis 810, which provides a good and stable platform for the force-generating part. The side frame 840 may be bolted to the shield plate 830 with screws 831.

The shield plate 830 and chassis 810 may be used for attaching a micro micromanipulator element to a stand, to another micromanipulator element or to a holder.

The constant force spring 870 consists of strip material, which has been shaped and pre-tensioned into a tightly wound roll, and may be advantageous to compensate constant load caused by gravitational force and/or momentum from affecting the movement of the movable element. The tip of the strip extending from the roll may be attached to a shaft or a bar or other protrusion or it may be glued or fixed to place by other means, and can be either on the moving element such as the sledge 850 or on the non-moving element such as the chassis 810. The fitting of the other end of the spring can be done on a number of ways, an exemplary but non-limiting listing including a shaft fitting, a bearing or a conduit with or without inner fitting, a fitting in location pocket, a fitting to a movable device or by other means. The fitting methods are well known to those with ordinarily skills in the art. The spring may extend from the roll partly or completely. For the purpose of the aspects of the present disclosure, it is advantageous if the spring produces a constant force throughout its deflection and thus acts as a force-generating part interacting with at least one micromanipulator element and may provide compensation by mechanical means for the effects of additional factors in the change of position of a movable element in the micromanipulator arrangement. That is, the spring produces essentially constant force in its normal operating area regardless of the extension of the spring. It could be contemplated, that a force-generating part such as a conventional spring may be advantageous in situations where an actuator or a movable element moves against a variable force, i.e. the part or element to be moved may have its own spring constant, and by balancing the spring constants of the spring and the part or element to be moved, such as a movable element, the varying load may be compensated.

The spring 870 may further provide a more homogeneous step size or to counteract an effect caused by gravity or load in a micromanipulator arrangement. Piezo components and linear piezo motor may have a resonance frequency range, in which they may generate force or movement most effectively. This frequency may vary and depend on materials used for the components. The velocity may also be affected by load, which thus may cause variation to the step size. Gravity affects especially in vertically directed movements, where both the mass of the manipulator element and the load attached to it may affect the step size. By arranging a spring to provide a constant force to the movable element it may be possible to compensate at least partly these additional factors which have an effect on the change of position of one movable element, element stack or micromanipulator arrangement.

The spring may be any force-generating part, for example, but not limited to, a constant force spring, a compression spring, an extension spring, a leaf spring, a gas spring, a hydraulic spring or the like, or it may be a magnet such as an electromagnet or the like. The spring may be located either inside or outside the micromanipulator element or may extend through the element, depending of the configuration. The magnetic field generated may not be preferable in the presence of the position sensor and a magnetic strip and may interact in a disadvantageous manner.

Figure 6B:
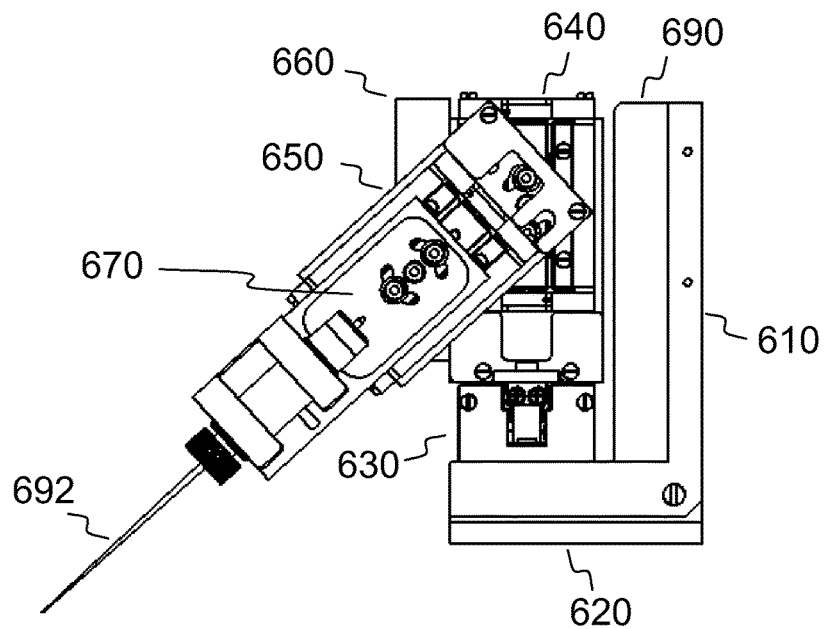
FIGS. 6a and 6b show a micromanipulator module according to an example embodiment.
Figure 6A:
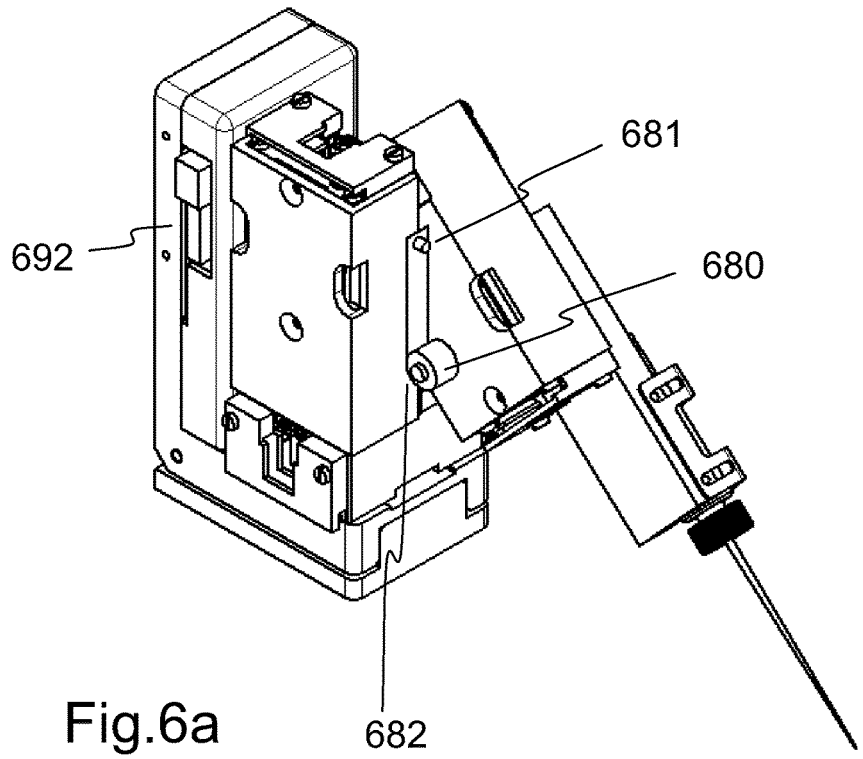

In FIGS. 6a and 6b a micromanipulator module according to an example embodiment is shown. In FIG. 6a three micromanipulator elements 630, 640 and 650 are stacked together. The micromanipulator stack is connected to the base part of an L-shaped stand 610 by bolts through the chassis of the first micromanipulator element 630. The base may comprise a hinged structure 620 allowing the tipping of the upper part of the system away from the target. The hinged structure may be held in place with the help of magnets that are releasable by twisting the stand backwards. Tipping the upper part away from the target may allow for easy access to the part holding the tool 692 e.g. for changing or adjusting the tool. Accessing the tool may also be facilitated by sliding the holder 670 front to the back position on the rail. The stand 610 may have a space for a box 690 that may contain a battery and/or electronic circuit, such as a control unit for controlling the micromanipulator elements. The battery charger port 692 may be attached to the side of the box 690. The electronic circuit may comprise control arrangement of at least one movable element, element stack, circuit card, control unit or micromanipulator arrangement via cables or wires or it may comprise means for a wireless control arrangement of at least one movable element, element stack, circuit card, control unit or micromanipulator arrangement.

The micromanipulator elements 630, 640 and 650 may comprise a spring 680 with a shielding plate 660. The spring 680 is advantageous as it is a constant force-generating part which may provide a more homogeneous step size or counteract an effect caused by gravity or load in a micromanipulator arrangement. The spring may be attached in a various ways as described above for a single movable element in FIG. 5, and may be placed to the micromanipulator elements 640 and 650, which may be intended for movements involving vertical change of positions, where gravity may be an additional factor to compensate. Advantageously the spring may be attached form one end to an adapter which may be used for attaching micro-manipulator elements 640 and 650 and from the other end to the linear guide of the micromanipulator element 640, as this allows for convenient operation of the element stacks in variable angles while keeping the spring in place.

Figure 7A:
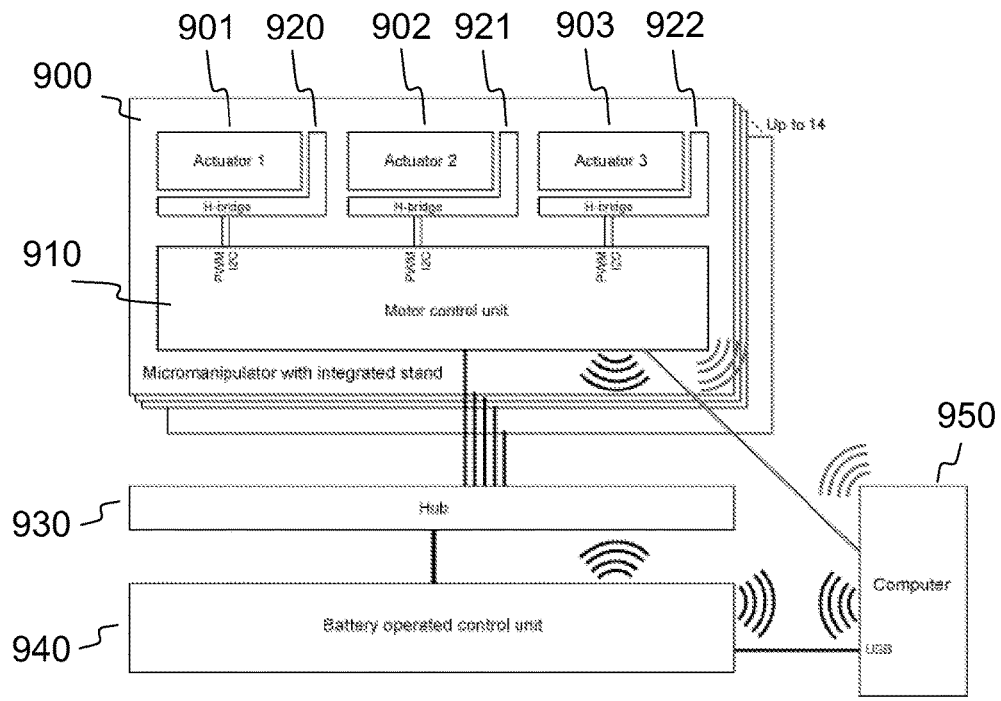
FIGS. 7a and 7b shows a schematic representation of connections of a micromanipulation arrangement on a system and interface level according to an example embodiment.
Figure 7B:
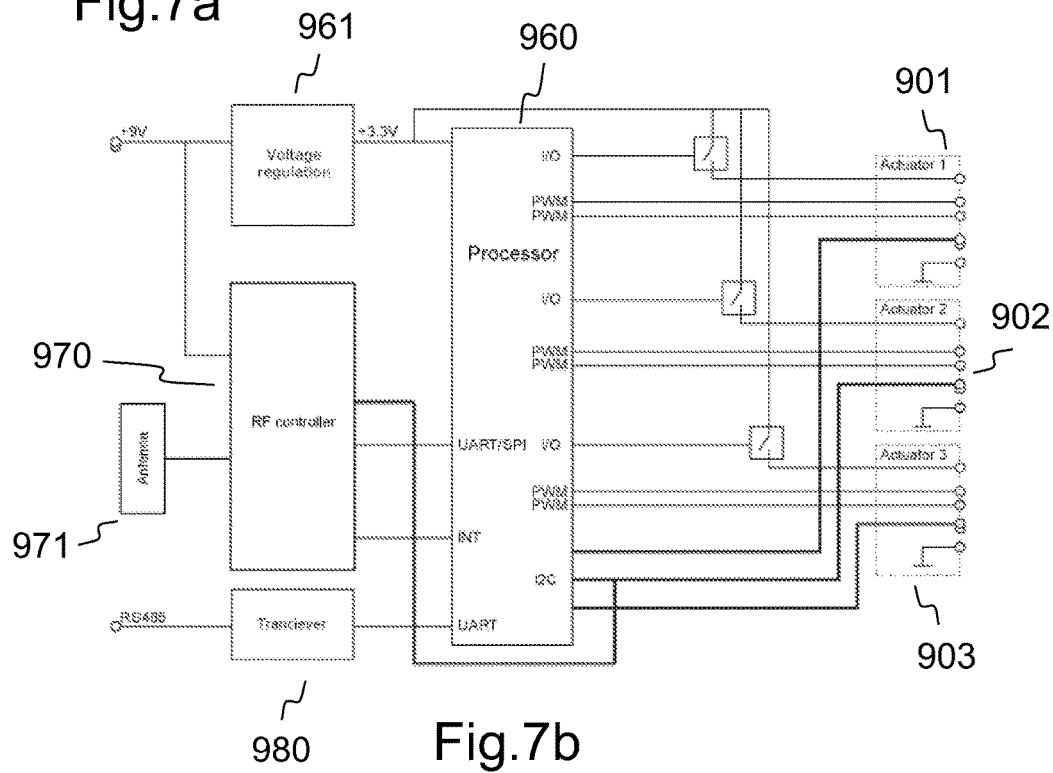

FIGS. 7a and 7b show a schematic representation of connections of a micromanipulation arrangement on a system and interface level according to an example embodiment. The micromanipulator arrangement 900 may comprise three actuators 901, 902 and 903 each with an H-bridge circuit 920, 921 and 922, respectively, a hub 930, a control unit 940 and a computer 950. The H-bridge circuits 920, 921 and 922 may have a piezo-driver IC circuit, which converts logic level pulse width modulated (PWM) input signal and enhance it to a maximum of 35 V output signal. The H-bridge circuits 920, 921 and 922 may have a position sensor and a digital to analogue (DA) transformer for adjusting the voltage. The position sensor may provide a feed-back signal based on detected position of the movable element. The micromanipulation arrangement 900 may be connected directly to the computer or it may be connected to the computer via the hub 930 and the control unit 940. The connection may be either via a connection cable such as a USB connection or through a wireless connection arrangement. The control unit 940 and hub 930 may control several micromanipulator arrangements. This is advantageous as experiments may require more than one tool or several different types of tools to be used at the same time in a synchronized manner. An example of this may be an IVF experiment where one tool is needed for holding a cell or a cell structure while another type of tool is needed to inject genetic material into a cell or a cell structure. Another example may be a patch-clamping experiment where several electrodes, such as in multi-electrode arrays, may be placed into a cell culture to measure interactions in complex experiments.

The computer 950 may control the micromanipulation arrangement via the control unit 940 or by connecting directly to the motor control unit 910. The motor control unit 910, the control unit 940 and the computer 950 may have RF controller 970 and antenna 971 for wireless control between the units. The wireless control may further be arranged on an element stack, circuit card, control unit or micromanipulator arrangement. An example of the antenna may be an F-antenna on a circuit. The RF controller may have a balun unit, i.e. an electrical transformer that can convert electrical signals that are balanced about ground (differential) to signals that are unbalanced (single-ended), and the reverse, RAM memory and FLASH memory and may be connected to the main controller through a serial port. The RF controller may have a place for a debugger on the circuit which may be used for debugging or program loading purposes. Additional signalling routes may be added which may be advantageous for control signalling purposes. At the computer end the wireless control unit may be an integrated device or an external device such as a RF dongle.

The use of a wireless connection is advantageous as this allows more freedom to place the modules of the micromanipulator arrangement in situations where space is limited and conventional configurations would not work. This also may reduce the number of instruments or units in crowded environments. In addition, in certain experiments it may be useful to isolate the micromanipulator arrangement or the whole microscope system from operator or the surrounding environment, such as when using bio hazardous substances, radioactive material or when live cell requiring special conditions are used. In situations where the system is surrounded by a cage for homogeneous temperature, gas atmosphere or humidity, it is advantageous that the micromanipulator may be controlled in a wireless manner.

The motor control unit 910 may communicate with the control unit via a RS485 port, with transceiver 980 connected to the universal asynchronous receiver transmitter (UART) pins of the processor 960 that may be used to convert serial port data to parallel port data format. The circuit termination may be software controlled with a computer program product and the circuit may have an electro-static discharge (ESD) protection.

In FIG. 7b an example embodiment is shown of the schematic diagram of electronics and the interface of a micromanipulator arrangement. The micromanipulator may be integrated into a stand, wherein a motor control unit is located, which may participate in a closed-loop control of the micromanipulator, i.e. it may send information to the actuators 901, 902 and 903 of how to adjust direction and velocity of movement. The drive voltages may be sent to the circuit through a RS485 port via a transceiver 980. The drive voltage is produced with a control unit. The voltage controller 961 is connected to each of the actuators 901, 902 and 903 through an I/O switch, which may be regulated through a voltage controller 961. The drive voltages may also be produced by connecting a battery such as a Li-Ion battery to the motor control unit if wireless connection mode is used. The processor 960 may be a microprocessor and may have a number of connections such as pulse wave modulated outputs (PWM) and pulse inputs for controlling the piezo-electric actuators 901, 902 and 903 and reading the feedback information from the H-bridge sensors and encoders. Further, the processor may have bus interfaces such as UART and I2C and a parallel port for easier control of display driver, which may be used at the control unit. The electronically erasable programmable read-only (EEPROM) memory may be implemented with a computer program product on a FLASH-EEPROM emulator. This may be advantageous as FLASH memory works in a similar manner to the EEPROM but is more cost efficient and can be erased by sectors, which enables a more simple logic to be used and therefore may take less space on a circuit. The inter-integrated circuit or I2C interface may be multiplexed with an additional circuit to couple more than one device to the processor 960. The processor may have a serial type debug connection, which may be used to debug a program running on a processor or to load a new program to the processor. The control unit of the micromanipulator arrangement may comprise various electronic devices for measuring, storing or processing information, and producing, sending or receiving a signal such as wave or a pulse, with adjustable parameter, such as frequency, amplitude, current or shape or the like, based on the received information. For example, the signal may be pulse-width modulation signal that is formed based on the received information (pulse width is modulated based on the information).

Figure 8:
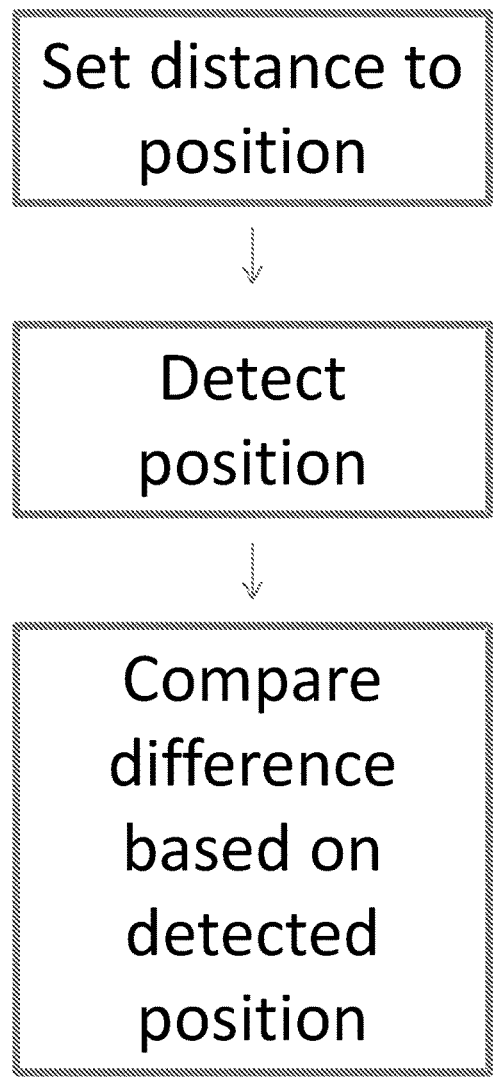
FIG. 8 shows a flowchart for a method for compensating an effect of an external factor in a micromanipulation arrangement according to an example embodiment.

FIG. 8 shows a flowchart for a method for compensating an effect of an external factor in a micromanipulation arrangement according to an example embodiment. The micromanipulator may comprise at least two drive stems arranged in a parallel manner, and a movable element arranged on the drive stems to move along the drive stems, the drive stems being arranged to cause a change in a position of the movable element with respect to the drive stem. The micromanipulator modules may comprise a sensor or component for position detection, motor controller unit and a controller unit to control more than one micromanipulator in the arrangement. The system may further comprise a computer and a computer program product which may be used in a manner which allows the computer program product to execute a series of commands, which perform the tasks of setting a distance to a position, which may be a target position or a reference position, calculating step size and number of steps to move to reach the destination, commencing a series of consecutive movements to achieve this target, during which the position sensors detect their actual or current positions at defined time points and send information of the current location to the control unit. Based on said detecting of said actual position and a reference position, which may be a target position or an original position or an earlier position, a compensation may be determined for compensating at least partly the effect of additional factors, wherein a given signal such as wave or a pulse, with adjustable parameter, such as frequency, amplitude, shape of the wave, current, drive voltage, number of drive pulses or the like may be used for adjustment. The information may be used in a feedback manner, advantageously as a closed-loop system. Advantageously the difference between the current position and earlier or previous position may be used to determine compensation for too small or too large step sizes, to reach the set destination with increased accuracy.

It is to be noted that advantageously compensation in a micromanipulator arrangement may be provided through a force-generating part such as a spring to compensate for an effect caused by gravity for a movable element or element stack or micromanipulator module or micromanipulator arrangement or to a part of it. Further, advantageously this compensation by mechanical means may be in addition to a controller unit arranged to communicate with other devices connected to the micromanipulator arrangement in such a way that the controller unit can gather information and based on the gathered information provide compensation by electronic means for the effect in the change of position of at least one movable element, element stack or micromanipulator arrangement caused by the same or another additional factor. The compensation may further be achieved with an adjustment unit, said adjustment unit arranged to send, receive and handle information in digital form to provide compensation for the effect in the change of position of at least one movable element, element stack or micromanipulator arrangement caused by an additional factor, such that an essentially homogenous movement is achieved. This adjustment unit may comprise a computer program product with a computer program code that is arranged to execute commands on at least one processor of the system, which will carry out tasks or operations to achieve the compensation.

Figure 9:
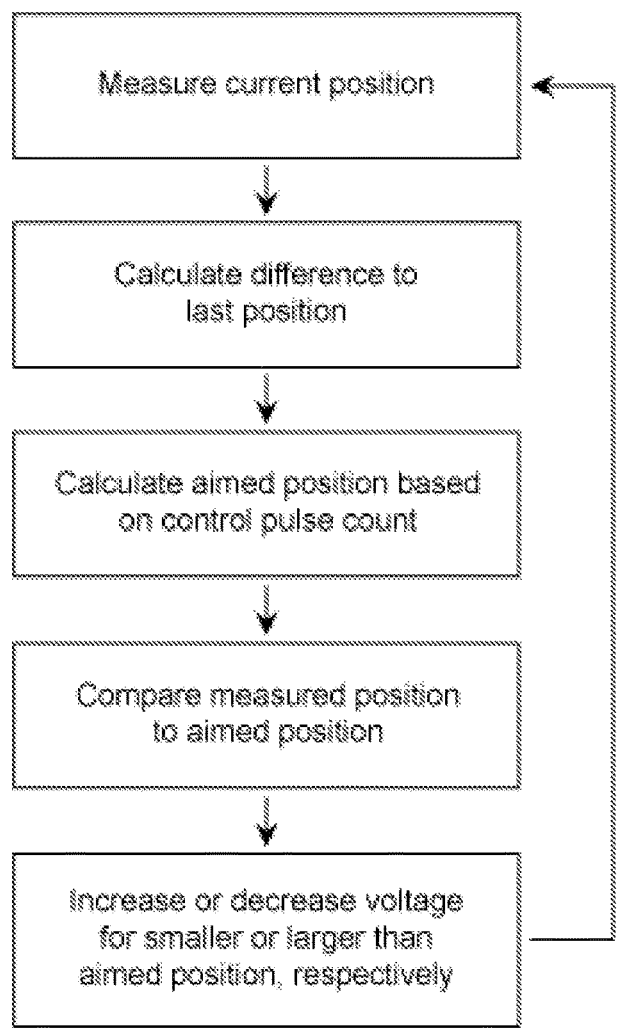
FIG. 9 shows a flowchart for a method for compensating an effect of an external factor by adjusting a drive voltage in a micromanipulation arrangement according to an example embodiment.

FIG. 9 shows a flowchart for a method for compensating an effect of an external factor by adjusting a drive voltage in a micromanipulation arrangement according to an example embodiment. This method for controlling a micromanipulation arrangement may comprise setting a target position for a movable element of the micromanipulator arrangement and detecting actual or current position of said movable element, calculating difference to last position and calculating aimed or target position based on a parameter such as a control pulse count, comparing measured or determined position to aimed or target position and increasing or decreasing voltage or other adjustable parameter for smaller (shorter) or larger (longer) than aimed position, respectively, to compensate at least partly effect of an additional factor or factors which may cause a difference in the step size.

Figure 10:
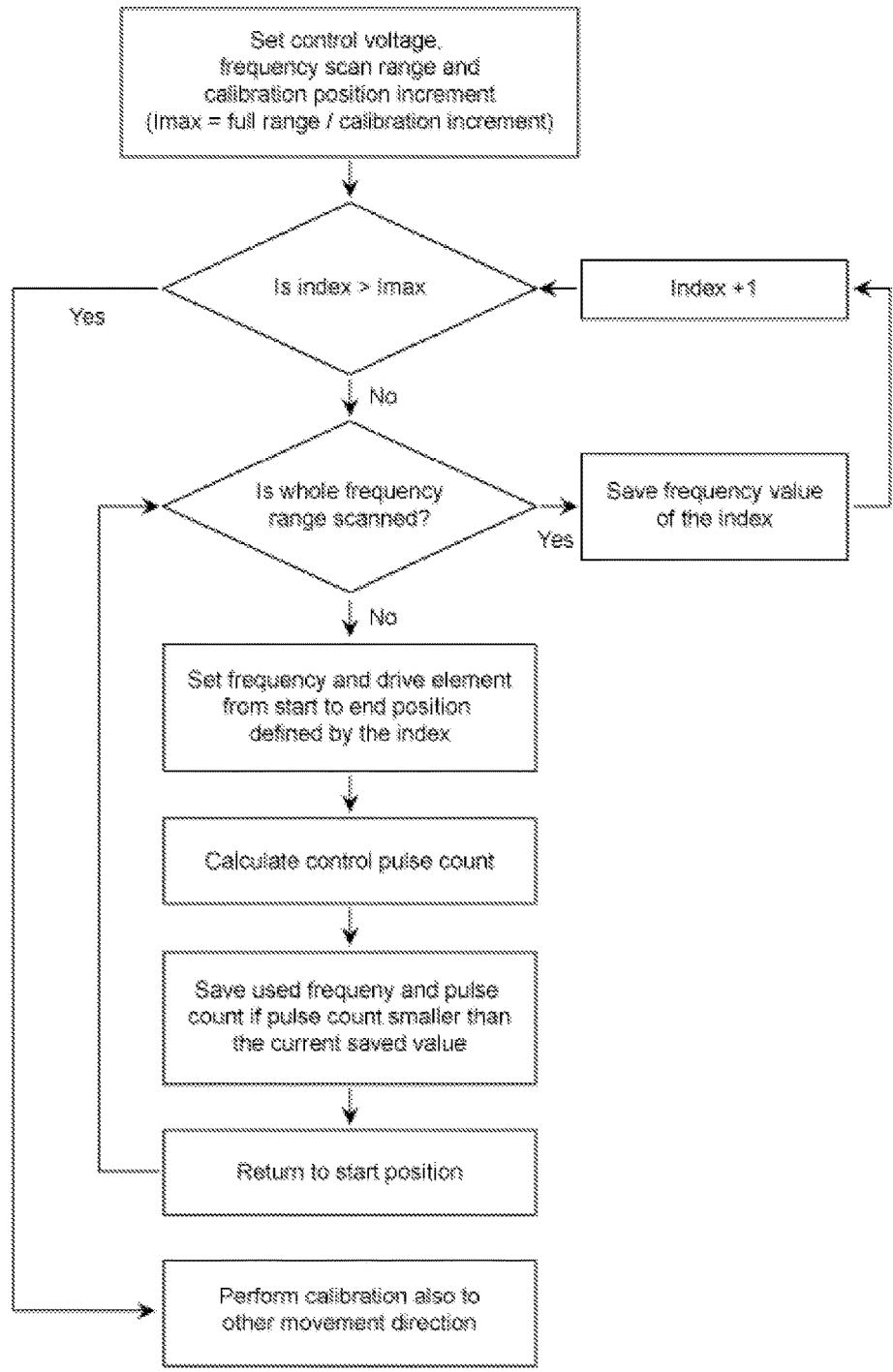
FIG. 10 shows a flowchart for a method for compensating an effect of an external factor by automatic calibration according to an example embodiment.

FIG. 10 shows a flowchart for a method for compensating an effect of an external factor by automatic calibration according to an example embodiment. A computer program product may be arranged to cause the system to carry out operations, where optimal control parameters are determined for the application in question. The calibration may be performed on a micromanipulator element or element stack or module in more than one direction, e.g. on both directions of a single micromanipulator element with one dimensional movement capability. Calibration may be performed by using any adjustable parameter, such as frequency, amplitude, shape of the wave, current, drive voltage, number of drive pulses or the like. In an example embodiment a control voltage, frequency scan range and a calibration position increment is set and an iterative loop in a feed-back manner may be performed where the whole frequency is scanned and the control pulses calculated to determine a frequency value, such as a resonance frequency, for optimal performance. Advantageously this may in addition be used to choose a calibration resolution, i.e. the amount of times to look for optimal parameter on a given movement range, to adjust the frequency to control the waves forming to the rods in the micromanipulator elements. By adjusting the pulse frequency or pulse ratio on areas where the movement may require more power this may be used to enable more homogeneous movement. In another example embodiment a single resonance frequency is determined by scanning the whole movement range, which frequency is then used for calibration. This may be a more robust form of calibration with good repeatability and may in some applications be more suitable than a multipoint calibration. This resonance frequency may depend on the natural frequency of the piezoelectric element or assembly and on the mechanical resonances of the assembly or micromanipulator element.

According to an example embodiment a computer program product may comprise a computer program code that is executed on at least one processor of the system to cause the system to carry out operations to determine an effect of an additional factor that may be compensated by calibration. The computer program product may then arrange a function to be formed that may be indicative of compensation needed at different instances, wherein the said function may comprise a mapping table between a reference position and at least one from the group of drive voltage, drive frequency and a pulse ratio. That is, a function or a mapping table may be formed by a calibration procedure, the function or mapping table indicating the compensation needed at different instances to reach a target position in order to compensate for non-homogeneity of movement of the movable element. It could be contemplated that the mapping table may use any adjustable parameter, such as frequency, amplitude, shape of the wave, current, drive voltage, number of drive pulses or the like. Drive voltage adjustment may be an advantageous method to perform calibration or compensation, as it is an adaptive way to continuously control changes in step size, power production and velocity in a micromanipulator element or arrangement. A voltage may have a certain range with a minimum and a maximum value, wherein it may be adjusted based on distance measurements and calculations from actual and reference positions such as target, original or earlier positions.

Figure 11:
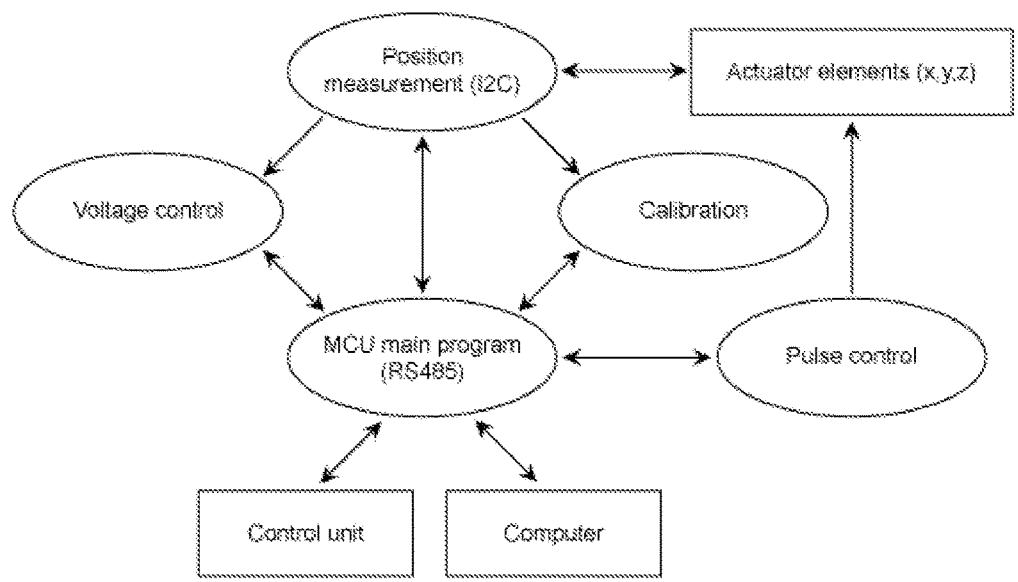
FIG. 11 shows a block diagram of a micromanipulator system according to an example embodiment.

FIG. 11 shows a block diagram of a micromanipulator system according to an example embodiment. The micromanipulator system may comprise a computer with a computer program product for a micromanipulator system, said computer program product comprising computer program code arranged to, when said computer program code is executed on at least one processor of the system, to cause the system to carry out the method to control and operate the micromanipulator system. The system may comprise a control unit, which may control various devices such as micromanipulator elements, actuator elements, motor control unit and other devices. The control unit may gather information and based on the gathered information provide compensation by electronic means for the effect in the change of position of at least one movable element, element stack or micromanipulator arrangement caused by an additional factor. The control unit or the computer may be arranged to operate with communication cables such as RS485 port or in a wireless manner. The control may also be accomplished directly from the computer. The main computer program product may be in charge of executing functions to operate the system, and may communicate to the actuator elements through adjustable parameters such as pulse control or by other means as described above for FIG. 10. The units in charge of position measurement may communicate information to the main control unit for calibration or voltage control purposes, or it may send information directly. The system may be operated from a control unit in a stand-alone manner, i.e. having the means to carry out the method independently or it may have an interface to be operated through a computer program product.

The various embodiments of the present disclosure can be implemented with the help of computer program code that resides in a memory and causes the relevant apparatuses to carry out the aspects of the present disclosure, or with circuitry achieving the same. For example, a control unit may comprise circuitry and electronics for handling, receiving and transmitting data, computer program code in a memory, and a processor that, when running the computer program code, causes the control unit to carry out the features of an embodiment. Yet further, a computer may comprise circuitry and electronics for handling, receiving and transmitting data, computer program code in a memory, and a processor that, when running the computer program code, causes the computer to carry out the features of an embodiment.

The various embodiments of the aspects of the present disclosure can in addition be implemented with the help of a micromanipulator arrangement comprising the relevant apparatuses to carry out the aspects of the present disclosure, or with devices achieving the same. For example, a mechanical precision instrument may comprise mechanical parts, electrical circuits or components, piezoelectric parts and programmable elements or devices that, when operating the instrument, causes the devices to carry out the features of an embodiment.

The various embodiments of the present disclosure can be further implemented with the help of an electronic circuit comprising the relevant apparatuses to carry out the aspects of the present disclosure, or with devices achieving the same. For example, an external control device connected via a command port or an interface may cause a control unit to carry out the features of an embodiment. Further, an electronic circuit may comprise tools for handling, receiving and transmitting data. The circuit may contain a processor and a program code in a memory, that, when operating, causes the instrument to carry out the features of an embodiment.

It is obvious that the aspects of the present disclosure are not limited solely to the above-presented embodiments, but it can be modified within the scope of the appended claims.

The invention claimed is:

1. A micromanipulator arrangement; comprising
at least two drive stems arranged in a parallel manner,
a movable element arranged on the drive stems to move along the drive stems,
the drive stems being arranged to cause a change in a position of the movable element with respect to the drive stem;
wherein an additional factor of gravity exists having an effect on the homogeneity of the change of the position of the movable element between upward and downward directed movement,
a spring having one end coupled to the movable element and another end coupled to a fixed part of the micromanipulator arrangement, the spring being configured to provide a constant force to the moveable element for compensating said additional factor of gravity such that said effect on said homogeneity is diminished, and
said spring arranged to interact with at least one micromanipulator element such that the constant force provided by the spring provides essentially constant compensation by mechanical means for the effect on said homogeneity of the change of position of said movable element caused by said additional factor of gravity, wherein the spring produces essentially constant force in its normal operating area regardless of the extension of the spring.

2. The micromanipulator arrangement according to claim 1, comprising an element stack comprising a first micromanipulator element, a second micromanipulator element, the first micromanipulator element being mounted on a moving part of the second micromanipulator element, wherein said at least one micromanipulator element is a piezoelectric element or a magnetostrictive element.

3. The micromanipulator arrangement according to claim 1, said arrangement comprising a controller unit arranged to communicate with other devices connected to the arrangement in such a way that the controller unit can gather information and based on the gathered information provide compensation by electronic means for the effect in the change of position of said movable element caused by said additional factor.

4. The micromanipulator arrangement according to claim 3 wherein said controller unit comprises at least one electronic device for measuring, storing or processing information, and producing, sending or receiving a pulse-width modulated signal based on the received information.

5. The micromanipulator arrangement according to claim 3 further comprising a detector for detecting position of a micromanipulator element.

6. The micromanipulator arrangement according to claim 3 comprising a sensor arranged to provide a feed-back signal based on detected position of the movable element.

7. The micromanipulator arrangement according to claim 3 comprising a receiver for receiving a feed-back signal from a position sensor.

8. The micromanipulator arrangement according to claim 1, said arrangement comprising an adjustment unit, said adjustment unit arranged to send, receive and handle information in digital form to provide compensation for the effect in the change of position of at least one movable element, element stack or micromanipulator arrangement caused by an additional factor, such that an essentially homogenous movement of said movable element is achieved.

9. The micromanipulator arrangement according to claim 1, said arrangement comprising a wireless control arrangement of at least one movable element, element stack, circuit card, control unit or micromanipulator arrangement.

10. A method for controlling a micromanipulator arrangement comprising at least two drive stems arranged in a parallel manner, and a movable element arranged on the drive stems to move along the drive stems, the drive stems being arranged to cause a change in a position of the movable element with respect to the drive stem, said method comprising:
setting a reference position for a movable element of the micromanipulator arrangement,
detecting an actual position of said movable element,
determining an effect of an additional factor of non-homogeneity having an effect in the change of the position of the movable element based on a difference between said reference position and said actual position; and
compensating at least partly said effect of said additional factor of non-homogeneity in the micromanipulator arrangement by one or more of increasing or decreasing a drive voltage, increasing or decreasing a number of drive pulses and increasing or decreasing a pulse ratio to adjust driving parameters of the control unit to drive the movable element.

11. The method according to claim 10, comprising
providing a feed-back signal based on detected position of the movable element
receiving a feed-back signal from a position sensor.

12. The method according to claim 10, comprising:
based on said detecting of said actual position, determining a compensation for compensating at least partly said effect of said additional factor, wherein
said compensation comprises adjusting a drive voltage of a driving unit for driving said movable element.

13. The method according to claim 10, further comprising:
based on said detecting of said actual position, determining a compensation for compensating at least partly said effect of said additional factor, wherein
said compensation comprises adjusting a number of drive pulses of a driving unit for driving said movable element.

14. The method according to claim 10, wherein said determining an effect of an additional factor comprises forming a function by a calibration procedure, said function being indicative of compensation needed at different instances to reach a target position in order to compensate for non-homogeneity of movement of said movable element.

15. The method according to claim 14, wherein said function comprises a mapping table between a position and at least one from the group of drive voltage, drive frequency and a pulse ratio.

16. A control unit for micromanipulator arrangement,
the micromanipulator arrangement comprising at least two drive stems arranged in a parallel manner, and a movable element arranged on the drive stems to move along the drive stems, the drive stems being arranged to cause a change in a position of the movable element with respect to the drive stem, wherein said control unit is configured to:
set a reference position for a movable element of the micromanipulator arrangement,
detect an actual position of said movable element,
determine an effect of an additional factor of non-homogeneity having an effect in the change of the position of the movable element based on a difference between said reference position and said actual position; and
compensate at least partly said effect of said additional factor of non-homogeneity in the micromanipulator arrangement by one or more of increasing or decreasing a drive voltage, increasing or decreasing a number of drive pulses and increasing or decreasing a pulse ratio to adjust driving parameters of the control unit to drive the movable element.

17. A computer program product for a micromanipulator system, the micromanipulator system comprising at least two drive stems arranged in a parallel manner, and a movable element arranged on the drive stems to move along the drive stems, the drive stems being arranged to cause a change in a position of the movable element with respect to the drive stem, said computer program product comprising computer program code embodied on a non-transitory computer readable medium and arranged to, when said computer program code is executed on at least one processor of the system, to cause the system to-set a reference position for a movable element of the system,
detect an actual position of said movable element,
determine an effect of an additional factor of non-homogeneity having an effect in the change of the position of the movable element based on a difference between said reference position and said actual position; and
compensate at least partly said effect of said additional factor of non-homogeneity in the micromanipulator arrangement by one or more of increasing or decreasing a drive voltage, increasing or decreasing a number of drive pulses and increasing or decreasing a pulse ratio to adjust-driving parameters driving the movable element.

18. A wireless micromanipulator, said micromanipulator comprising
at least two drive stems arranged in a parallel manner a movable element arranged on the drive stems to move along the drive stems the drive stems being arranged to cause a change in a position of the movable element with respect to the drive stem, wherein an additional factor of gravity exists having an effect on the homogeneity of the change of the position of the movable element between upward and downward directed movement, a force-generating unit for compensating said additional factor of gravity such that said effect on homogeneity is diminished, said force-generating unit is a constant-force spring having one end coupled to the movable element and another end coupled to a fixed part of the micromanipulator that is configured to provide a constant force to the movable element.

19. The micromanipulator of claim 1, wherein the spring is disposed parallel relative to the at least two drive stems.

* * * * *